United States Patent
Emmerich et al.

(10) Patent No.: US 9,061,694 B2
(45) Date of Patent: Jun. 23, 2015

(54) EQUIPMENT TROLLEY

(71) Applicants: Bernd Emmerich, Engen (DE); Andreas Jansche, Zimmern ob Rottweil (DE)

(72) Inventors: Bernd Emmerich, Engen (DE); Andreas Jansche, Zimmern ob Rottweil (DE)

(73) Assignee: KARL STORZ GMBH & CO. KG (DE)

( * ) Notice: Subject to any disclaimer, the term of this patent is extended or adjusted under 35 U.S.C. 154(b) by 0 days.

(21) Appl. No.: 14/180,926

(22) Filed: Feb. 14, 2014

(65) Prior Publication Data
US 2014/0232079 A1 Aug. 21, 2014

(30) Foreign Application Priority Data
Feb. 15, 2013 (DE) .......................... 10 2013 101 525

(51) Int. Cl.
*B62B 3/02* (2006.01)
*B62B 5/00* (2006.01)

(52) U.S. Cl.
CPC ... *B62B 3/02* (2013.01); *B62B 5/00* (2013.01); *B62B 2301/05* (2013.01); *B62B 2301/10* (2013.01)

(58) Field of Classification Search
CPC .. B62B 5/0083; B62B 5/0086; B62B 5/0093; B62B 3/02; B62B 3/022
USPC ........... 280/638, 35, 43, 47, 43.11, 43.13, 280/43.14, 43.15, 43.16, 79.11, 79.3, 763.1, 280/766.1; 180/209; 430/395, 396; 16/19, 16/31 R, 31 A, 40, 30
See application file for complete search history.

(56) References Cited

U.S. PATENT DOCUMENTS

| | | | | |
|---|---|---|---|---|
| 115,779 | A * | 6/1871 | Stafford et al. | 280/35 |
| 5,464,243 | A * | 11/1995 | Maiwald et al. | 280/638 |
| 5,476,432 | A * | 12/1995 | Dickens | 482/67 |
| 6,843,625 | B2 * | 1/2005 | Hewitt | 410/66 |
| 7,540,509 | B1 * | 6/2009 | Boraas et al. | 280/79.11 |
| 7,988,161 | B2 * | 8/2011 | Kilday | 280/79.11 |
| 8,474,835 | B1 * | 7/2013 | Rossi | 280/47.35 |
| 2010/0283227 | A1 | 11/2010 | Perelli et al. | |

FOREIGN PATENT DOCUMENTS

DE 29801799 U1 3/1998
DE 19819356 B4 9/2004

* cited by examiner

*Primary Examiner* — John Walters
(74) *Attorney, Agent, or Firm* — Whitmyer IP Group LLC

(57) ABSTRACT

An equipment trolley with a support framework, which has at least one shelf area for receiving items of equipment, and a base plate, wherein support arms provided with castors are mounted on the base plate. In order to create an instrument trolley that ensures a very high degree of stability and resistance to overturning, it is proposed according to the invention that at least one support arm can be secured on the base plate so as to be extendable and adjustable in the horizontal plane of the base plate.

19 Claims, 3 Drawing Sheets

EQUIPMENT TROLLEY

FIELD OF THE INVENTION

The invention relates to an equipment trolley with a support framework, which has at least one shelf area for receiving items of equipment, and a base plate, wherein support arms provided with castors are mounted on the base plate.

BACKGROUND OF THE INVENTION

Equipment trolleys of this kind are known in different embodiments particularly in the medical sector. The equipment trolleys generally have a support framework with various shelf areas and/or drawers, which serve to receive a wide variety of items of equipment, for example pumps, instruments and light sources. In addition, the equipment trolleys are often fitted with pivotable retaining arms for monitors via which, for example, the operating surgeon can follow the operation during endoscopic surgery.

The equipment trolleys have to be designed for mobile use and must have a high degree of stability and resistance to overturning. To increase the resistance to overturning, it is known to arrange the center of gravity of the equipment trolleys as low down as possible, by a suitable arrangement of the items of equipment that are to be transported.

An equipment trolley of the kind in question is known from DE 298 01 799 U1. To increase the stability, the support arms of the castors in this known equipment trolley are designed to be extendable. As a result of the extendibility of the support arms, it is possible to enlarge the standing area of the equipment trolley, but only in the predefined directions of the support arms connected fixedly to the base plate.

A shift of the center of gravity, for example of an equipment trolley provided with a pivotable retaining arm for a monitor, can be counteracted only to an insufficient extent by the extendable support arms.

SUMMARY OF THE INVENTION

Proceeding from this, the object of the invention is to configure an equipment trolley of the kind mentioned at the outset in such a way that it ensures a very high degree of stability and resistance to overturning.

According to the invention, this object is achieved by the fact that at least one support arm can be secured on the base plate so as to be extendable and adjustable in the horizontal plane of the base plate.

Through the possibility not only for a support arm provided with a castor to be extended relative to the base plate in the horizontal plane of the base plate, i.e. for the end of the support arm carrying the castor to be drawn farther away from the base plate, but also for the support arm to be repositioned horizontally in the plane of the base plate, it is possible for the first time to enlarge the standing area of the equipment trolley specifically in such a way that the enlargement of the standing area can be carried out exactly where the center of gravity of the equipment trolley has been unfavorably shifted, for example as a result of the outward pivoting of a retaining arm.

According to a preferred embodiment of the invention, it is proposed that all the support arms can be secured on the base plate so as to be extendable and adjustable in the horizontal plane of the base plate, and in addition the support arms are extendable and adjustable independently of one another and individually, so as to be able to specifically adjust the support arms to improve the stability and resistance to overturning, it also being possible, for example, to take into account the confined spaces available in an operating theater.

The extensibility of the support arms can also be effected, for example, by the telescopic configuration of the support arms.

In a practical embodiment of the invention, it is proposed that the at least one support arm can be secured on the base plate so as to be extendable and adjustable in a stepless manner, in order to permit a particularly fine-tuned adaptation of the support arms to the altered center of gravity of the equipment trolley.

According to an alternative embodiment of the invention, it is proposed that the at least one support arm can be secured on the base plate so as to be extendable and adjustable in predefined latching steps.

It is further proposed by the invention that a bolt can be secured on the free end of the at least one support arm toward the base plate, such that the at least one support arm is mounted on the base plate so as to be pivotable about the bolt. This kind of design permits, in a particularly simple manner, a lateral adjustment of the respective support arm by simple pivoting about the pivot bolt.

In an equipment trolley configured according to the invention, the at least one support arm is secured in its respective position on the base plate via bolts that can be fitted into corresponding bores in the base plate and in the support arm.

By providing several bores in the base plate and in the support arm at different places, the support arm can be secured on the base plate at different positions and in different degrees of extension.

By providing oblong holes on the support arm or the base plate, the support arm can also be connected to the base plate with the aid of the bolts so as to be adjustable in a stepless manner. In order to secure the bolt in the oblong hole, it can be provided with a thread, for example, onto which a threaded nut can be screwed in order to secure the support arm on the base plate. Alternatively, one or more bores on the support arm and/or on the base plate can be provided with an inner thread, into which a bolt provided with a suitable outer thread can be screwed. In this way, the support arm can be easily and quickly released from the base plate and secured again at another position.

In a practical embodiment of the invention, it is proposed that the base plate is composed of two plates which are spaced apart from each other and arranged parallel to each other, wherein the support arms are mounted between the two plates of the base plate.

The plates can be at very different distances from each other. Advantageously, the distance can correspond substantially to the thickness of a support arm. This has the advantage that the support arm is held safely between the plates of the base plate. By additional provision of lateral guides, between which the support arm is pushed in between the plates, a secure orientation of the support arm can also be ensured. Such guides can be provided at different positions laterally on or between the plates, in order to be able to secure the one or more support arms at different positions on the base plate when necessary.

To increase the resistance to overturning, it is advantageous to arrange the center of gravity of the equipment trolley as low down as possible. For this purpose, according to the invention, it is proposed that the space between the two plates of the base plate can be used as an additional receiving space for items of equipment, in particular for heavy system components such as transformers.

Finally, the invention proposes that the castors are arranged on the free front ends of the support arms directed away from the base plate, and that, starting from the bearing point of the castors, the support arms are angled downward in a step shape in the direction toward the base plate.

Advantageously, the downwardly angled configuration of the support arms according to the invention is such that the support arms are mounted on the base plate approximately at the height of the horizontal rotation axis of the castors, as a result of which the center of gravity of the equipment trolley is shifted farther downward and the castors also obtain increased resistance to overturning.

BRIEF DESCRIPTION OF THE DRAWINGS

Further features and advantages of the invention will become clear from the attached drawings in which several illustrative embodiments of an equipment trolley according to the invention are depicted purely by way of example, without limiting the invention to these illustrative embodiments. In the drawings.

DETAILED DESCRIPTION OF THE INVENTION

Figure 1:
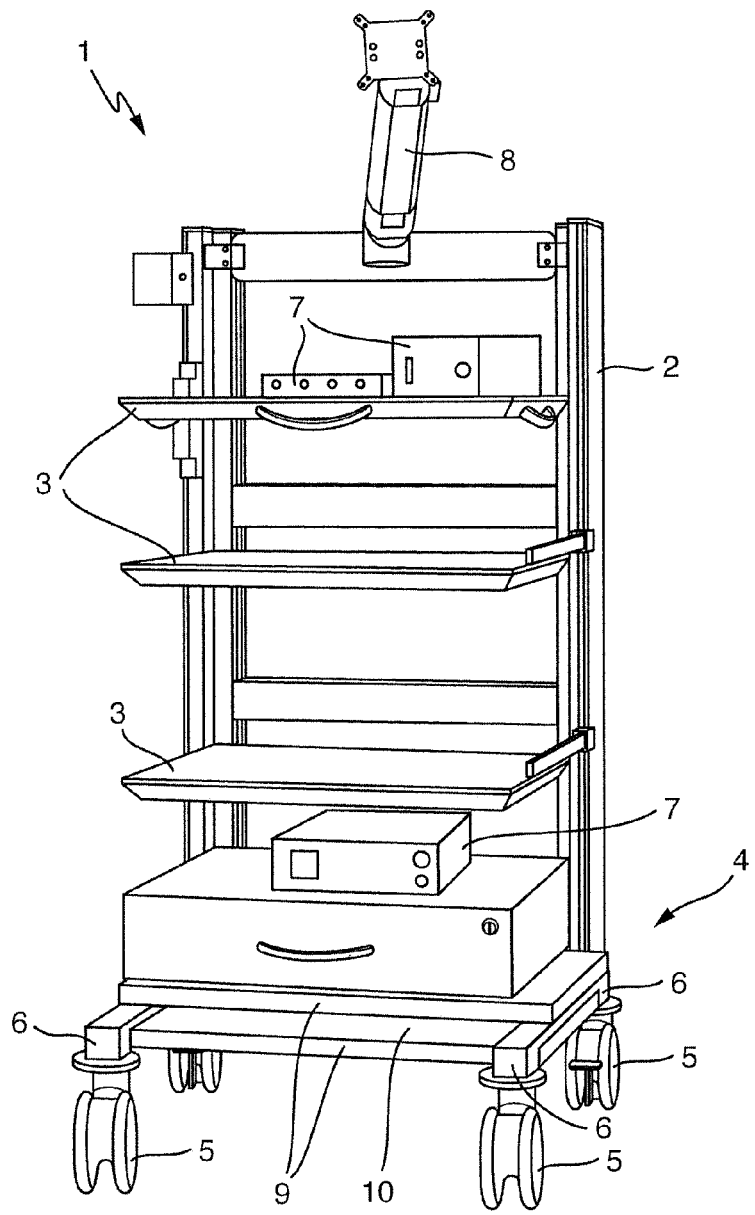
FIG. 1 shows a schematic perspective front view of an equipment trolley according to the invention.

The illustration in FIG. 1 shows a perspective front view of an equipment trolley 1, which is composed principally of a support framework 2, with shelf areas 3 arranged parallel to one another and over one another on the support framework 2, and of a lower base plate 4, wherein support arms 6 provided with castors 5 are mounted on the base plate 4.

The shelf areas 3 serve to receive a wide variety of items of equipment 7, for example instruments, infusion pumps and the like. At the upper end of the support framework 2, a pivotable retaining arm 8 is arranged which serves to receive a monitor on which, for example in endoscopic surgery, the operating surgeon can view and follow the operation.

Since the equipment trolley 1 is designed for mobile use by means of the castors 5, the equipment trolley 1 needs to have a high degree of stability and resistance to overturning.

In the illustrative embodiments shown, the stability and resistance to overturning of the equipment trolley 1 can be achieved by enlarging the standing area of the equipment trolley 1, for which purpose at least one support arm 6 provided with a castor 5 can be secured on the base plate 4 so as to be extendable and adjustable in the horizontal plane of the base plate 4.

Figure 2:
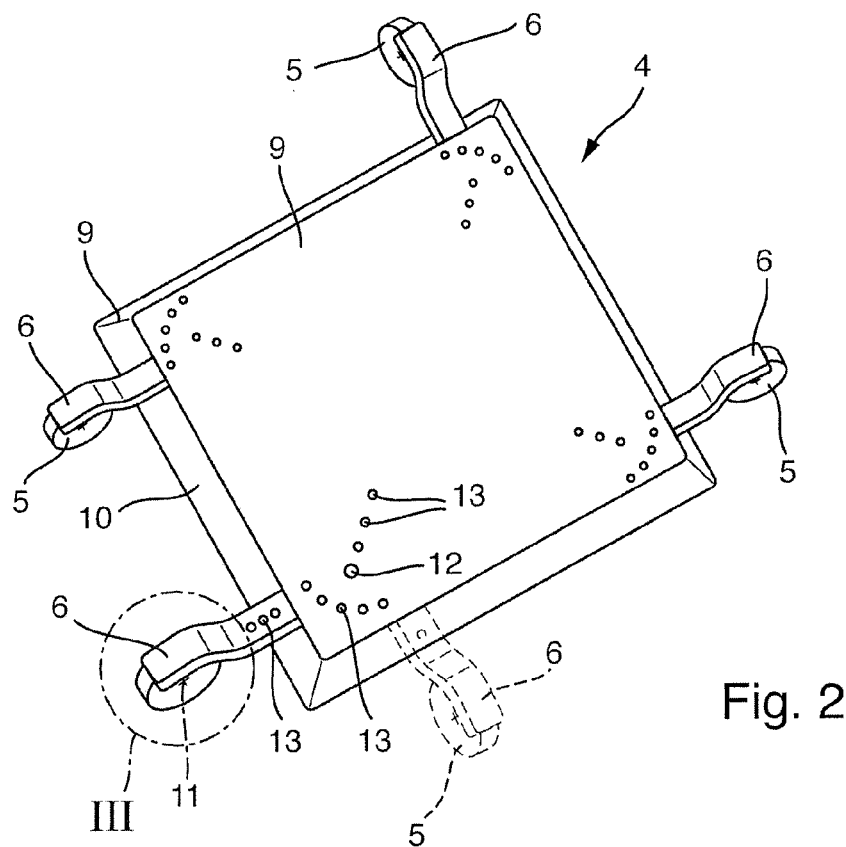
FIG. 2 shows a schematic view of a first embodiment of the base plate of an equipment trolley according to FIG. 1.
Figure 4:
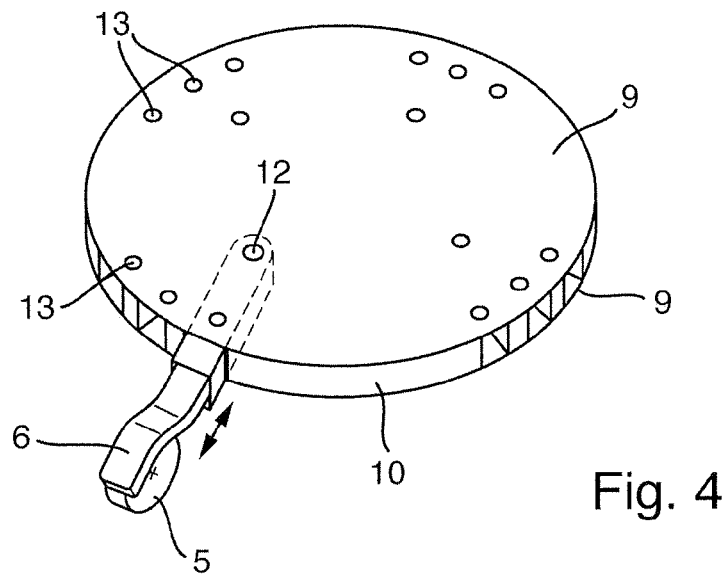
FIG. 4 shows a view according to FIG. 2, but depicting a second embodiment.

In the embodiments shown in the illustrations in FIGS. 1, 2 and 4, all the support arms 6 can be secured on the base plate 4 so as to be individually extendable and adjustable independently of one another.

The shape of the base plate 4 and the number of the support arms 6 provided with the castors 5 can vary from embodiment to embodiment. The crucial aspect for improving the stability and resistance to overturning is the possibility of enlarging the standing area of the equipment trolley 1 by extending and adjusting the position of the support arms 6, and therefore also of the castors 5, in the horizontal plane of the base plate 4.

By specific adjustment of each individual support arm 6 provided with a castor 5, it is possible to very deliberately counteract a possible shift of the center of gravity of the equipment trolley 1, for example caused by the pivoting of the retaining arm 8 provided with a monitor and arranged at the upper end of the support framework 2.

The individual adjustability of each support arm 6 also ensures, for example, that a very high degree of stability and resistance to overturning can be achieved even within the confined spaces in an operating theater.

In the illustrative embodiments shown, the base plate 4 is in each case composed of two plates 9 which are arranged parallel to each other and spaced apart one above the other, wherein a space 10 is formed between the plates 9 and serves, for example, for mounting the support arms 6. In the illustrative embodiment shown in FIG. 4, the distance between the two plates 9 corresponds substantially to the thickness of a support arm 6. To better secure the support arm 6 between the plates 9, it is arranged in a guide surrounding it at the edge of the base plate 4.

To increase the resistance to overturning of an equipment trolley 1, it is generally known to arrange the center of gravity of the equipment trolley 1 as low down as possible.

Figure 3:
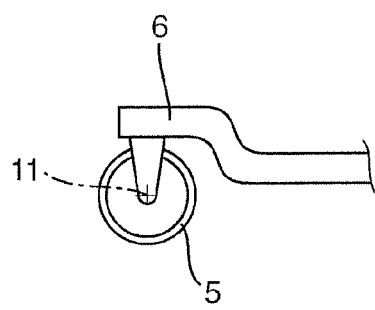
FIG. 3 shows an enlarged view of the detail III according to FIG. 2.

In the depicted embodiments of an equipment trolley 1, this is achieved, as can be seen in particular from FIG. 3, by the fact that the castors 5 are arranged on the free front ends of the support arms 6 directed away from the base plate 4, and that, starting from the bearing point of the castors 5, the support arms 6 are angled downward in a step shape in the direction toward the base plate 4, such that the support arms 6 are mounted on the base plate 4 approximately at the height of the horizontal rotation axis 11 of the castors 5.

Moreover, the center of gravity of the equipment trolley 1 can be shifted farther down by virtue of the fact that the space 10 between the two plates 9 of the base plate 4 can be used as an additional receiving space for items of equipment, in particular for the relatively heavy transformers of the appliances which, for safety reasons, are operated with low voltage or extra-low voltage.

The extension and adjustment of the support arms 6 in the horizontal plane of the base plate 4 can be seen, for example, from the illustrations in FIGS. 2 and 4.

At least one of the support arms 6 is secured in its respective position on the base plate 4 via bolts 12 that can be fitted into corresponding bores 13 in the base plate 4 and the support arms 6. As an alternative to the configuration as a bore 13, it is also possible for the seat for the bolts 12 on the support arms 6 to be designed as oblong holes.

As an alternative to the use of bolts 12 for fixing the support arms 6 in their respective position on the base plate 4, it is of course also possible to secure the support arms on the base plate 4 via screw connections. For this purpose, the bores 13 can have an inner thread, for example, and the bolts 12 can have a matching outer thread for securing the bolts 12 in the bores 13.

FIG. 2 shows, at one corner of the base plate 4, the positions between which a support arm 6 is adjustable in this embodiment of the base plate 4, namely between a widely extended position (solid line), adjusted fully to the left, and the pushed-in position (broken line), adjusted fully to the right.

As an alternative to lengthening a support arm 6 by extension from the base plate 4 and fixing with a bolt 12, it is also possible for the support arms 6 to have a telescopic design, i.e. to be able to be pushed into and pulled out of each other, or to be screwed in and unscrewed via a thread length.

In the embodiment shown in FIG. 4, the support arms 6 are mounted on the base plate 4 so as to be pivotable about a bolt 12, which can be secured on the free end of the support arms 6 toward the base plate. In the case of the circular base plate 4 depicted, the radial length of the support arms 6 always remains constant during the pivoting about the bolt 12. The radial lengthening of the support arms 6 can be obtained via a telescopic or screwable configuration.

Figure 5:
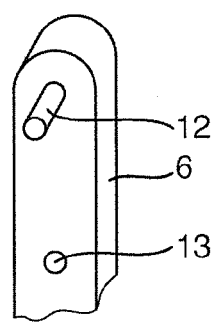
FIG. 5 shows an enlarged detail of a support arm.

The illustration in FIG. 5 shows part of a support arm 6 of the kind that can be used in the embodiment according to FIG. 4. In this case, the bolt 12 is arranged fixedly on the free end of the support arm 6 that can be secured on the base plate 4, and it is inserted into the corresponding bore 13 in the base plate 4 such that the support arm 6 is pivotable about this bolt 12. When fixing the support arm 6 in the respective pivoted position relative to the base plate 4, the bore 13 in the support arm 6 serves to receive a bolt 12 inserted into a bore of the base plate 4.

The equipment trolley 1 in the configuration described above is distinguished by the fact that the support arms 6 provided with the castors 5 are not only extendable in the horizontal plane of the base plate 4, but can also be repositioned in the horizontal plane of the base plate 4 in order to create the possibility of specifically enlarging the standing area of the equipment trolley 1, such that the enlargement of the standing area can be carried out exactly where the center of gravity of the equipment trolley 1 has been unfavorably shifted, for example as a result of the outward pivoting of a retaining arm 8.

LIST OF REFERENCE SIGNS 1 equipment trolley
2 support framework
3 shelf area
4 base plate
5 castor
6 support arm
7 item of equipment
8 retaining arm
9 plate
10 space
11 rotation axis
12 bolt
13 bore

The invention claimed is:

1. An equipment trolley with a support framework comprising at least one shelf area for receiving items of equipment, and a base plate,
   wherein support arms provided with castors are mounted on the base plate,
   wherein at least one support arm is secured on the base plate so as to be extendable and adjustable in a horizontal plane of the base plate, and
   wherein the at least one support arm is extendable away from the base plate so as to enlarge a standing area of the equipment trolley and counteract a shift of the center of gravity of the equipment trolley.

2. The equipment trolley according to claim 1, characterized in that all the support arms can be secured on the base plate so as to be extendable and adjustable in the horizontal plane of the base plate.

3. The equipment trolley according to claim 2, characterized in that the at least one support arm is secured on the base plate so as to be extendable and adjustable in a stepless manner.

4. The equipment trolley according to claim 2, characterized in that the base plate is composed of two plates which are spaced apart from each other and arranged parallel to each other.

5. The equipment trolley according to claim 2, characterized in that the castors are arranged on the free front ends of the support arms directed away from the base plate, and in that, starting from the bearing point of the castors, the support arms are angled downward in a step shape in the direction toward the base plate.

6. The equipment trolley according to claim 1, characterized in that the support arms are extendable and adjustable independently of one another and individually.

7. The equipment trolley according to claim 6, characterized in that the at least one support arm is secured on the base plate so as to be extendable and adjustable in predefined latching steps.

8. The equipment trolley according to claim 6, characterized in that the castors are arranged on the free front ends of the support arms directed away from the base plate, and in that, starting from the bearing point of the castors, the support arms are angled downward in a step shape in the direction toward the base plate.

9. The equipment trolley according to claim 1, characterized in that the at least one support arm is secured on the base plate so as to be extendable and adjustable in a stepless manner.

10. The equipment trolley according to claim 1, characterized in that the at least one support arm can be secured on the base plate so as to be extendable and adjustable in predefined latching steps.

11. The equipment trolley according to claim 1, characterized in that a bolt can be secured on a free end of the at least one support arm toward the base plate, such that the at least one support arm is mounted on the base plate so as to be pivotable about the bolt.

12. The equipment trolley according to claim 11, wherein the base plate has multiple bores directed away from the bolt towards the edges of the base plate, wherein a second bolt is inserted in one of the multiple bores to secure the at least one support arm.

13. The equipment trolley according to claim 1, characterized in that the at least one support arm is secured in the respective position of the at least one support arm on the base plate via bolts that are fitted into corresponding bores in the base plate and the support arm.

14. The equipment trolley according to claim 1, characterized in that the base plate is composed of two plates which are spaced apart from each other and arranged parallel to each other.

15. The equipment trolley according to claim 14, characterized in that the support arms are mounted between the two plates of the base plate.

16. The equipment trolley according to claim 1, characterized in that the castors are arranged on the free front ends of the support arms directed away from the base plate, and in that, starting from the bearing point of the castors, the support arms are angled downward in a step shape in the direction toward the base plate.

17. The equipment trolley according to claim 6, characterized in that the support arms are mounted on the base plate approximately at the height of the horizontal rotation axis of the castors.

18. An equipment trolley with a support framework comprising at least one shelf area for receiving items of equipment, and a base plate, wherein support arms provided with castors are mounted on the base plate, wherein at least one support arm is secured on the base plate so as to be extendable and adjustable in a horizontal plane of the base plate, wherein the base plate is composed of two plates which are spaced apart from each other and arranged parallel to each other, characterized in that a space between the two plates of the base plate is used as an additional receiving space for items of an equipment.

19. The equipment trolley according to claim 18, wherein the equipment is a transformer.

* * * * *